United States Patent [19]
Mukai et al.

[11] Patent Number: 5,844,387
[45] Date of Patent: Dec. 1, 1998

[54] ELECTRIC POWER STEERING DEVICE

[75] Inventors: Yoshinobu Mukai; Yoshiki Noro; Shinzi Hironaka, all of Saitama, Japan

[73] Assignee: Honda Giken Kogyo Kabushiki Kaisha, Tokyo, Japan

[21] Appl. No.: 588,352

[22] Filed: Jan. 18, 1996

[30] Foreign Application Priority Data

Jan. 31, 1995 [JP] Japan ..................................... 7-014531

[51] Int. Cl.$^6$ ....................................................... B62D 5/04
[52] U.S. Cl. ........................... 318/432; 318/293; 318/599; 318/430; 180/79.1
[58] Field of Search ..................................... 318/138, 139, 318/280–293, 430–479; 180/79.1, 142, 446; 364/424.051, 424.05, 424.053, 424.052

[56] References Cited

U.S. PATENT DOCUMENTS 4,719,396  1/1988  Shimizu .

FOREIGN PATENT DOCUMENTS 62-85763  4/1987  Japan .

*Primary Examiner*—Paul Ip
*Attorney, Agent, or Firm*—Carrier, Blackman & Associates, P.C.; Joseph P. Carrier; William D. Blackman

[57] ABSTRACT

An electric power steering device for directly applying the power of an electric motor as an auxiliary steering power to a steering system to lower a steering force required of the driver, wherein a current detecting element in a motor current detecting unit is connected in series with the motor, and a drive control unit is operable to always drive, by a PWM signal, that side of switching elements of a bridge circuit to which the motor is connected. With this construction, a high-frequency pulse noise generated upon the PWM driving of the the switching element is absorbed by an inductance in the motor and hence a high-frequency pulse noise detected by the current detecting element can be controlled at an extremely small level. Thus, the electric power steering device can prevent generation of abnormal noises from the motor and oscillation or hunting of the steering system and provide stable steering characteristics.

9 Claims, 6 Drawing Sheets

ELECTRIC POWER STEERING DEVICE

BACKGROUND OF THE INVENTION

1. Field of the Invention

The present invention relates generally to an electric power steering device for directly applying the power of an electric motor as a steering auxiliary power to a steering system to lower a steering force required of a driver, and more particularly to such an electric power steering device which is capable of preventing generation of abnormal noises from the electric motor and oscillation or hunting of the steering system.

2. Description of the Related Art

Electrical power steering devices are known in which the motor drive unit for driving an electric motor is composed of four field-effect transistors (FETs), and these FETs are controlled by a pulse-width modulation (PWM) signal supplied from a control unit so as to drive and control the motor by a motor current corresponding to a steering torque.

FIG. 3 shows the general construction of one such conventional electric power steering device.

In FIG. 3, the electric power steering device 1 generally comprises a steering wheel 2, a steering shaft 3, a hypoid gear 4, a rack-and-pinion mechanism 5 composed of a pinion 5a and a rack shaft 5b, a tie rod 6, a front wheel 7 as a steerable wheel, an electric motor 8 for producing a steering auxiliary force, a steering torque sensor 10 for detecting a steering torque acting on the steering wheel 2 and outputting a steering torque signal T converted into an electric signal corresponding to the steering torque, a vehicle velocity sensor 11 for detecting a vehicle speed or velocity and outputting a vehicle velocity signal V converted into an electric signal corresponding to the vehicle velocity, a control unit 12 for driving and controlling the motor 8 according to the steering torque signal T and the vehicle velocity signal V, a motor drive unit 13, and a motor current detecting unit 14.

When the steering wheel 2 is turned in one direction, the steering torque sensor 10 provided on the steering shaft 3 detects a steering torque, converts it into a corresponding electric signal and sends the electric signal as a steering torque signal T to the control unit 12.

A rotary motion given to the steering shaft 3 is transmitted to the rack-and-pinion mechanism 5 in which a rotational force of the pinion 5a is converted into an axial linear motion of the rack 5b which changes the direction of the front wheel 7 via the tie rod 6.

The vehicle velocity sensor 11 detects a velocity of the vehicle, converts it into a corresponding electric signal and sends the electric signal as a vehicle velocity signal V to the control unit 12.

The control unit 12 is operable based on the steering torque signal T and the vehicle velocity signal V to supply a motor control signal $V_O$ composed of a PWM signal and an ON/OFF signal to the motor drive unit 13 which in turn supplies a motor voltage $V_M$ corresponding to the motor control signal $V_O$ to the motor 8 to drive the same.

The motor 8 driven by the motor voltage $V_M$ applies a steering auxiliary force via the hypoid gear 4 to the steering system, thereby lowering a steering force to be applied by the driver to the steering wheel 2.

FIG. 4 is a block diagram showing a main portion of the conventional electric power steering device.

The control unit 12 of the electric power steering device 1 consists essentially of a microprocessor including various arithmetic and logic units, memories and processing units. More particularly, the control unit 12 includes a target current setting unit 15 for converting the steering torque signal T from the steering torque sensor 10 and the vehicle velocity signal V from the vehicle velocity sensor 11 into a target current signal $I_{MS}$ on a steering torque (T) vs. target current signal ($I_{MS}$) characteristic chart shown in FIG. 5 in which the vehicle velocity signal V is used as a parameter, a deviation signal determining unit 16 for computing a deviation signal $\Delta I$ between the target current signal $I_{MS}$ and a motor current signal $I_{MO}$ obtained via a low-pass filter 19 from a motor current signal $I_{MD}$ representing a motor current $I_M$ detected by the motor current detecting unit 14, a drive control unit 17 for converting the deviation signal $\Delta I$ to a voltage and generating a motor control signal $V_O$ to undertake a PWM control of the motor drive unit 13 for immediately bringing the deviation signal $\Delta I$ to zero, and the low-pass filter 19 for removing high-frequency components of the motor current signal $I_{MD}$ supplied from the motor current detecting unit 14.

The drive control unit 17 includes a PID (proportional plus integral plus derivative) control unit, a motor control signal generating unit and the like and operates to achieve a PID control of the deviation signal $\Delta I$ received from the deviation determining unit 16 and supply a motor control signal $V_O$ composed of a PWM signal corresponding to the target current signal $I_{MS}$ and an ON/OFF signal to the motor drive unit 13.

The low-pass filter 19 is composed, for example, of a primary CR (capacitor-resistor) low-pass filter and operates to remove high frequency components at an attenuation of 6 dB per octave in the band of frequencies above a cutoff angular frequency, thereby reducing noises contained in a high angular frequency band and a gain at the high angular frequency band without exerting any influence on steering characteristics.

The motor dive unit 13 is composed, for example, of a bridge circuit using four switching elements or devices such as power FETs and operates to drive and control each of two pairs of power FETs by the motor control signal $V_O$ composed of an ON/OFF signal and a PWM signal supplied from the drive control unit 17, so as to set the value and direction of a motor voltage $V_M$ to be supplied to the motor 8.

The direction of the motor voltage $V_M$ is determined in correspondence with the polarity of the motor control signal $V_O$ output from the drive control unit 17.

For instance, when a steering action to cause a right turn is taken, a steering torque signal T of the positive polarity is input to the target current setting unit 15 which in turn outputs a target current signal $I_{MS}$ of the positive polarity shown in FIG. 5, causing a motor current of the positive polarity to flow through the motor 8 to thereby produce a rightward steering auxiliary power.

In this condition, the motor current signal $I_{MD}$ detected by the motor current detecting unit 14 assumes the positive polarity, and the deviation signal $\Delta I$ output from the deviation determining unit 16 is a difference between the target current signal $I_{MS}$ and the motor current signal $I_{MO}$ corresponding to the motor current signal $I_{MD}$, ($I_{MS}$–$I_{MO}$). The deviation signal $\Delta I$ is immediately brought to zero so that the motor current $I_M$ becomes equal to the target current signal $I_{MS}$.

On the other hand, when a steering action to cause a left turn is taken, the target current signal $I_{MS}$ shown in FIG. 5, the motor current $I_M$ and the motor current signal $I_{MD}$ (=$I_{MO}$)

assume the negative polarity so that the deviation signal ΔI output from the deviation determining unit 16 is represented by $(-I_{MS}+I_{MO})$. The deviation signal ΔI is, again, immediately brought to zero.

Thus, regardless of whether the steering action is taken to cause a right turn or a left turn, the control unit 12 is capable of bringing the deviation signal ΔI to zero and thereby control the motor current $I_M$ at a signal quantity corresponding to the target current signal $I_{MS}$.

FIG. 6 is a circuit diagram showing a bridge circuit of the conventional motor drive unit.

In FIG. 6, the motor drive unit 13 includes four power FETs Q1–Q4 each of which includes a diode D1–D4 formed between the source and the drain due to own construction of the FET. The FETs Q1 and Q3 are connected to a direct current power supply $E_0$ while the FETs Q2 and Q4 are connected to the earth or ground (GND) of a vehicle body.

The motor 8 is connected between the junction between the FET Q1 and the FET Q2 and the junction between the FET Q3 and the FET Q4. The respective gates G1–G4 of the FETs Q1–Q4 are controlled by the motor control signal $V_0$ supplied from the motor control unit 17 shown in FIG. 4 so that a motor voltage $V_M$ and a motor current $I_M$ controlled by the PWM signal are supplied to the motor 8.

The bridge circuit may be composed of four power transistors in place of the power FETs in which instance a separate diode is connected in parallel with each of the power transistors.

Between the junction between the FET Q1 and the FET Q2 and the junction between the FET Q3 and the FET Q4, a resistor $R_D$ constituting a current detecting element of the motor current detecting unit 14 is connected in series with the motor 8 so that an absolute value of the motor current $I_M$ and the direction of the motor current $I_M$ are detected by a voltage $V_1$ appearing across the resistor $R_D$ and a sign (+ or –) of the voltage $V_1$, respectively.

In the state where a steering action to cause a right turn is taken, an ON signal $V_{ON}$, a PWM signal $V_{PWM}$ and an OFF signal $V_{OFF}$ of the current control signal $V_0$ are respectively supplied to the gate G1 of the FET Q1, the gate G4 of the FET Q4, and the respective gates G2 and G3 of the FETs Q2 and Q3, for example, whereupon a motor current $I_{M+}$ is caused to flow along a path which starts from the direct current power supply $E_0$, then passes successively through the FET Q1, the resistor $R_D$, the motor 8 and the FET Q4, and finally ends with the vehicle body ground GND, as indicated by the solid-lined arrows. Thus, the motor 8 is driven at the motor current $I_{M+}$.

On the other hand, in the state where a steering action to cause a left turn is taken, an ON signal $V_{ON}$, a PWM signal $V_{PWM}$ and an OFF signal $V_{OFF}$ of the current control signal $V_0$ are respectively supplied to the gate G3 of the FET Q3, the gate G2 of the FET Q2, and the respective gates G1 and G4 of the FETs Q1 and Q4 whereupon a motor current $I_{M-}$ is caused to flow along a path which starts from the direct current power supply $E_0$, then passes successively through the FET Q3, the motor 8, the resistor $R_D$ and the FET Q2, and finally ends with the vehicle body ground GND, as indicated by the broken-line arrows. Thus, the motor 8 is driven at the motor current $I_{M-}$.

The FETs Q1 and Q4 and the FETs Q2 and Q3 each forming opposed sides of the bridge circuit are controlled by the ON signal $V_{ON}$ and the PWM signal $V_{PWM}$ of the motor control signal $V_0$ with the result that the direction ($I_{M+}$ or $I_{M-}$) and magnitude of the motor current $I_M$ can be determined to thereby control the direction and velocity of rotation of the motor 8.

The resistor $R_D$ detects the direction and level of the motor current $I_{M+}$, $I_{M-}$ in the form of a voltage $V_1$ (polarity and voltage value thereof which in turn is converted into a current by the motor current detecting unit 14. The motor current detecting unit 14 outputs a motor current signal $I_{MD}$ which is changed via the low-pass filter 19 into a motor current signal $I_{MO}$ which is in turn fed back to the deviation determining unit 16.

FIG. 7 shows the construction of a main portion of the conventional motor current detecting unit.

The motor current detecting unit 14 is composed of a differential amplifier having an operation amplifier OP1 operable by a fixed voltage (+5V, for example) of the direct current power supply $E_0$, and a current conversion unit 18 for converting a detection voltage $V_D$ detected by the differential amplifier into a motor current signal $I_{MD}$ corresponding to an absolute value of the motor current $I_{M+}$, $I_{M-}$ flowing through the motor 8.

The differential amplifier includes the operation amplifier OP1, two resistors R for setting a bias (virtual ground), two resistors Ra for setting an input impedance, and two feedback resistors $R_b$. The virtual ground, the input impedance and a voltage gain G are respectively set at $E_0/2$, $R_a$ and $-R_b/R_a$. With this setting, the differential amplifier amplifies the potential difference $V_1$ at the resistor $R_D$ (with the voltage gain G) and outputs the detection voltage $V_D$ to the current conversion unit 18.

The current conversion unit 18 includes a voltage-to-current conversion unit composed of a memory such as a ROM (read-only memory) and operates to convert the detection voltage $V_D$ to a motor detection current $I_{MD}$ corresponding to the absolute value of a preset motor current $I_{M+}$, $I_{M-}$ and output the motor detection current $I_{MD}$ to the low-pass filter 19 shown in FIG. 4.

The current conversion unit 18 may be composed of a peak-hold circuit.

As described above, the conventional electric power steering unit 1 is capable of setting a target current signal $I_{MS}$ to be supplied to the motor 8 according to a steering torque signal T and a vehicle velocity signal V, feeding back a motor current signal $I_{MD}$ corresponding to a motor current $I_M$ flowing through the motor 8, and drive the motor 8 via the motor driving unit 13 using a PWM signal based on a deviation signal ΔI between the motor current signal $I_{MD}$ and the target current signal $I_{MS}$ to quickly bring the deviation signal ΔI to zero. It is, therefore, possible to drive the motor 8 at a motor current $I_M$ equal to the target current, thereby generating a desired steering auxiliary power.

In the conventional electric power steering device 1, however, since the motor drive unit 13 composed of a bridge circuit consisting of four switching devices is driven and controlled by a high-frequency PWM signal, with the motor 8 and the resistor $R_D$ forming a current detecting element of the motor current detecting unit 14 connected in series with the motor drive unit 13, a load of the motor drive unit 13 composed of a series combination of the resistor $R_D$ and the inductance of the motor 8 has a pulse response characteristic showing that the voltage waveform detected at the resistor $R_D$ varies with the direction of rotation of the motor 8.

FIG. 8 shows pulse response waveforms of the conventional resistor $R_D$.

When the motor drive unit 13 is in a state where the FET Q1 and the FET Q4 are driven by an ON signal and a PWM signal, respectively, to cause a motor current $I_{M+}$ to flow in the direction indicated by the solid-line arrows shown in FIG. 6, FET Q4 forms a pulse signal source driven by the high-frequency PWM signal (20 KHz, duration T=0.05 ms, for example). In this condition, since the pulse signal source is connected to the resistor $R_D$ via the inductance of the motor 8, the pulse component voltage at the resistor $R_D$ assumes the noise detection voltage $V_{IN}$ indicated by the solid line shown in FIG. 8, which voltage has a small value and is free from a pulse noise component.

On the other hand, when the motor drive unit 13 is in a state where the FET Q3 and the FET Q2 are driven by an ON signal and a PWM signal, respectively, to cause a motor current $I_{M-}$ to flow in the direction indicated by the broken-line arrows shown in FIG. 6, FET Q2 forms a pulse signal source driven by the high-frequency PWM signal (20 KHz, for example). In this condition, since the resistor $R_D$ is connected directly to the pulse signal source, the pulse component voltage at the resistor $R_D$ assumes the noise detection voltage $V_{IN}$ indicated by the broken line shown in FIG. 8, which voltage has a large value and contains a large pulse noise component.

The conventional electric power steering device 1, therefore, has a problem that when a steering action to cause either a right turn or a left turn is taken by the effect of the PWM driving of the motor drive unit 13, a noise detection voltage $V_{IN}$ containing a large pulse noise component is developed. The thus developed noise detection voltage $V_{IN}$ is fed back via the motor current detecting unit 14 with the result that the motor current $I_M$ is oscillated to cause the motor 8 to generate abnormal operation noises.

The motor current signal $I_{MD}$ containing a large noise component, which is detected from the motor current detecting unit 14 by the noise detecting voltage $V_{IN}$ containing a large pulse noise component, can attenuate its noise component as it passes through the low-pass filter 19 shown in FIG. 4. However, the low-pass filter 19 changes the phase of the motor current signal $I_{MD}$, causing oscillation or hunting in the current feedback path.

SUMMARY OF THE INVENTION

According to the present invention, there is provided an electric power steering device for directly applying the power of an electric motor as an auxiliary steering power to a steering system to lower a steering force required of the driver, wherein a current detecting element in a motor current detecting unit is connected in series with the motor, and a drive control unit is operable to always drive, by a PWM signal, that side of the switching elements of a bridge circuit to which the motor is connected. With this construction, a high-frequency pulse noise generated upon the PWM driving of the switching element is absorbed by an inductance in the motor and, hence, a high-frequency pulse noise detected by the current detecting element can be controlled at an extremely small level. Thus, the electric power steering device can prevent generation of abnormal noises from the motor and oscillation or hunting of the steering system and provide a stable steering characteristic.

The above and other objects, features and advantages of the present invention will become manifest to those versed in the art upon making reference to the detailed description and accompanying sheets of drawings in which a preferred embodiment incorporating the principles of the present invention is shown by way of an illustrative example.

DETAILED DESCRIPTION OF A PREFERRED EMBODIMENT

Figure 1:
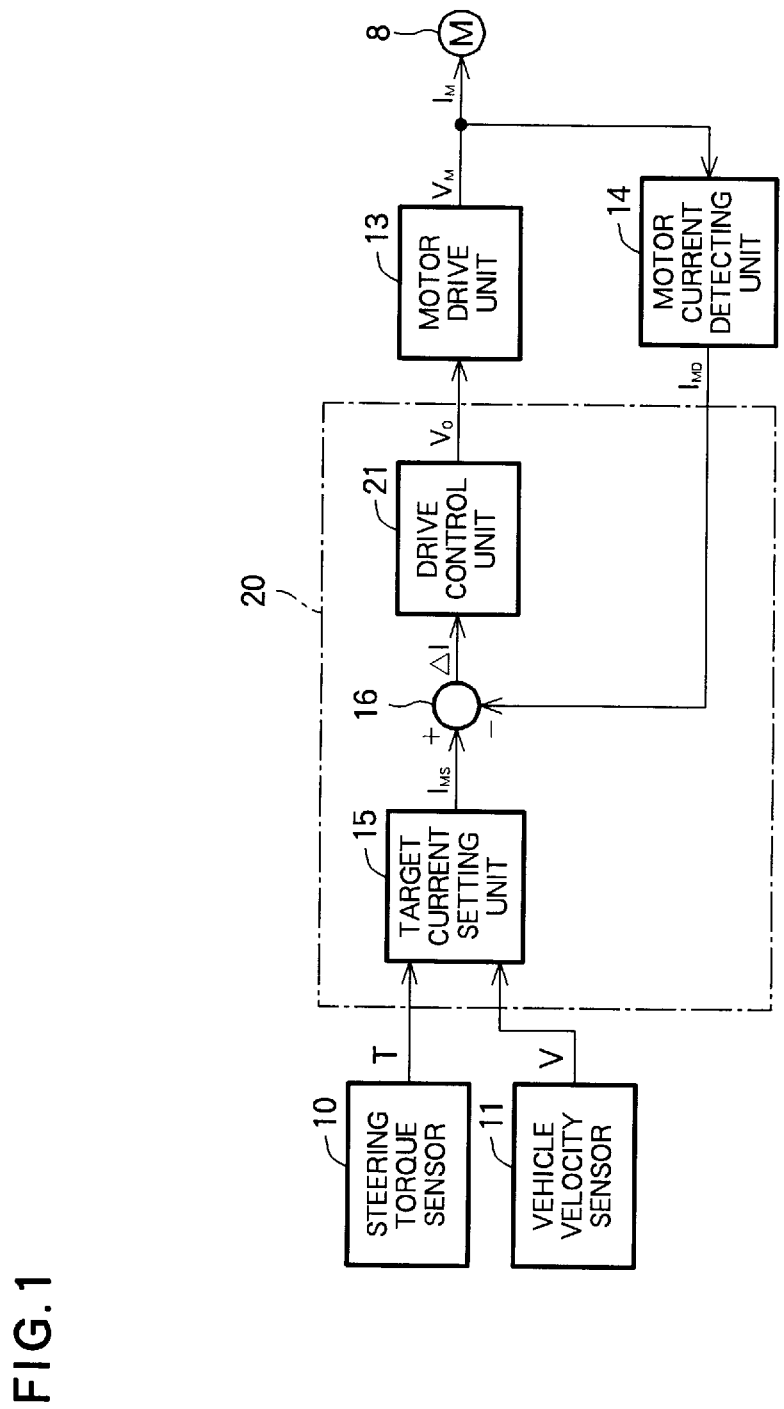
FIG. 1 is a block diagram showing a main portion of an electric power steering device according to the present invention.
Figure 2:
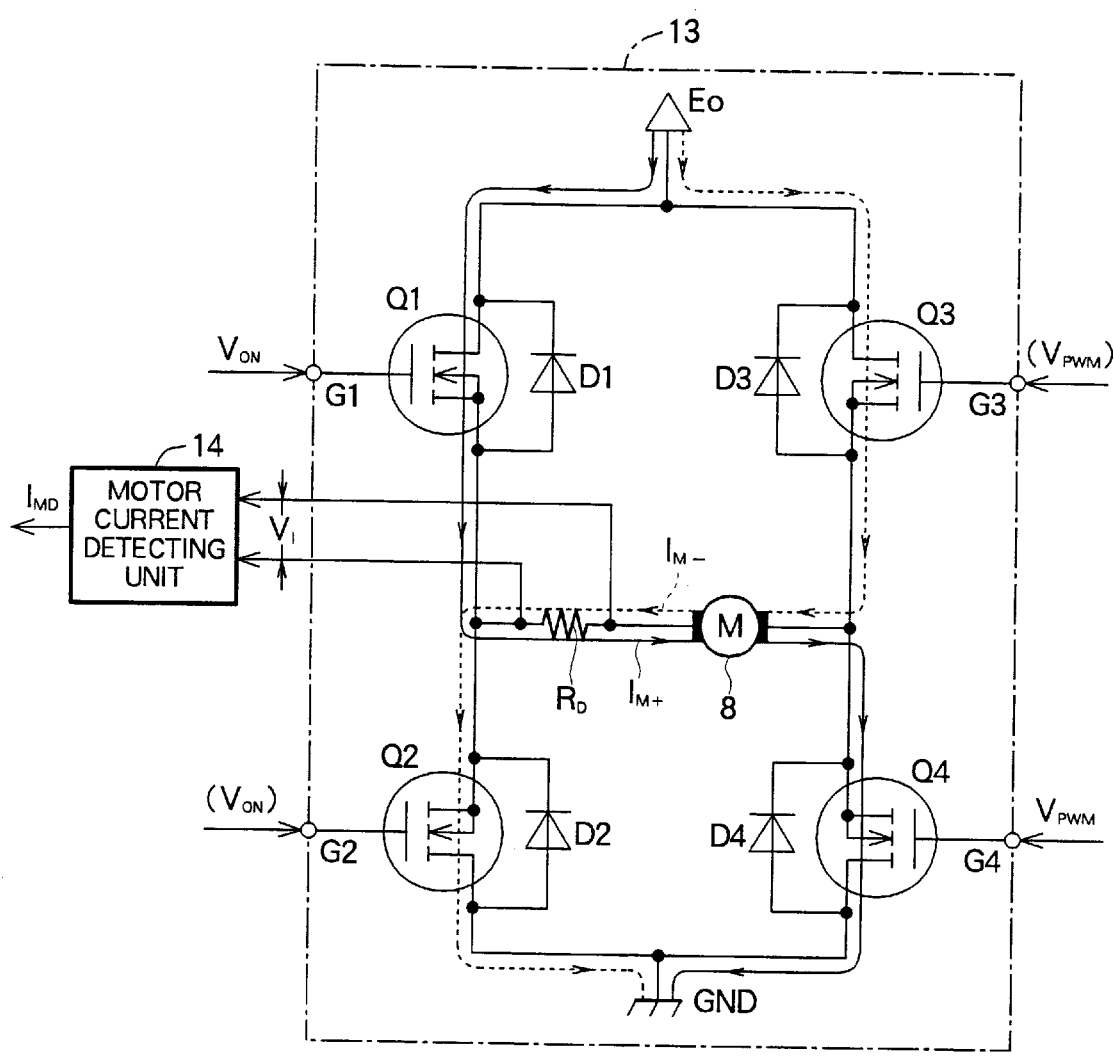
FIG. 2 is a circuit diagram showing the operation of a motor drive unit of the electric power steering device of FIG. 1.
Figure 3:
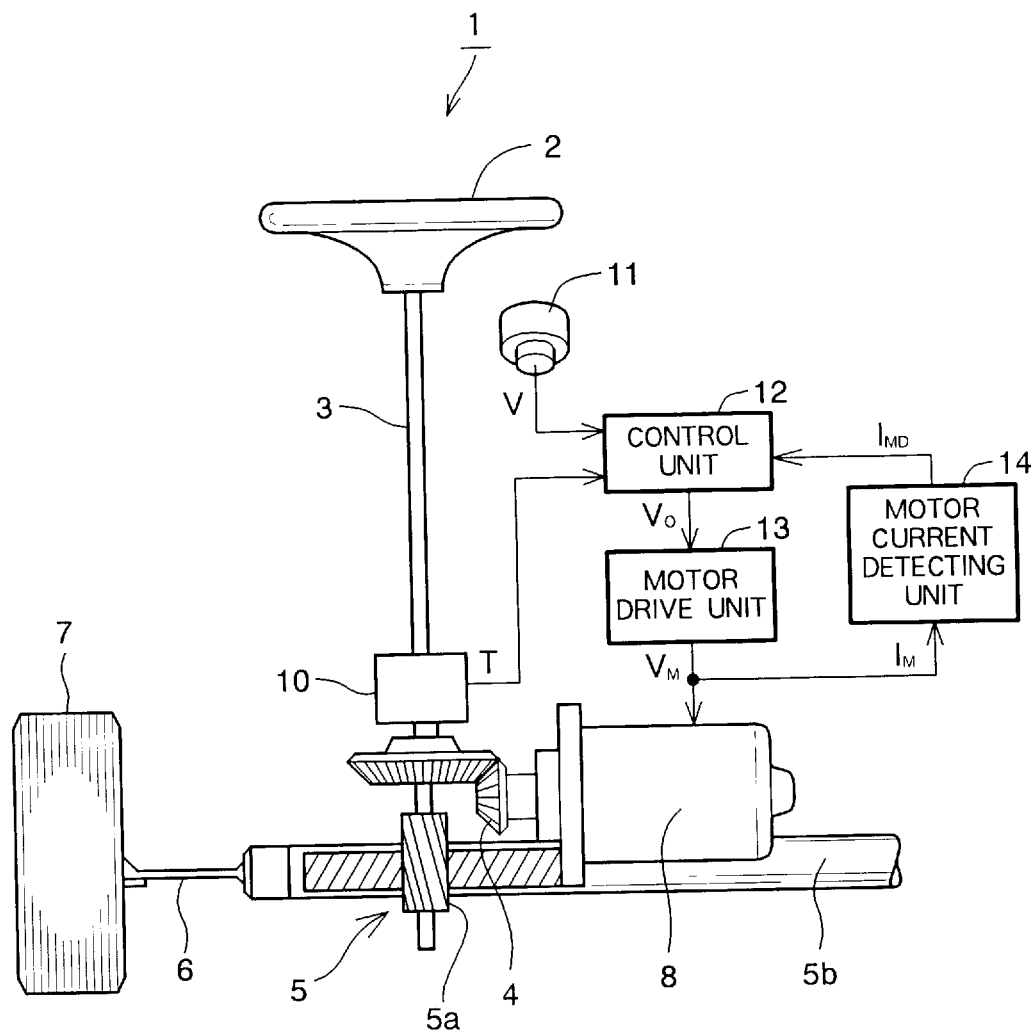
FIG. 3 is a view showing the general construction of a conventional electric power steering device.

Reference is initially taken to FIG. 1 which shows in block diagram a main portion of an electric power steering device according to the preferred embodiment of the present invention and to FIG. 2 which illustrates the operation of a motor drive unit of the preferred embodiment of the present invention.

The present invention includes a motor drive unit 13 composed of a bridge circuit formed by two pairs of switching elements or devices connected together such that the switching devices in each pair are driven by an ON signal (ON driving) and a PWM signal (PWM driving), respectively, to drive an electric motor into a forward rotation mode or a reverse rotation mode. The PWM driving of the switching devices is achieved such that a high-frequency pulse noise component generated by the PWM driving does not appear at a current detecting element connected in series with the motor.

In FIG. 1, a control unit 20 consists essentially of a microprocessor, various arithmetic and logic units, processing units and memories and includes a target current setting unit 15, a deviation computing unit 16 and a drive control unit 21.

Figure 4:
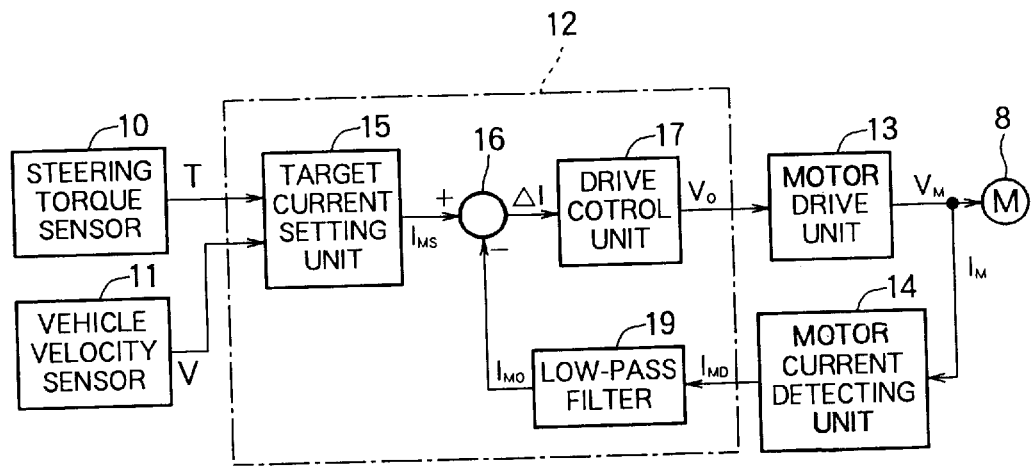
FIG. 4 is a block similar to FIG. 1, but diagram showing a main portion of the conventional electric power steering device.
Figure 5:
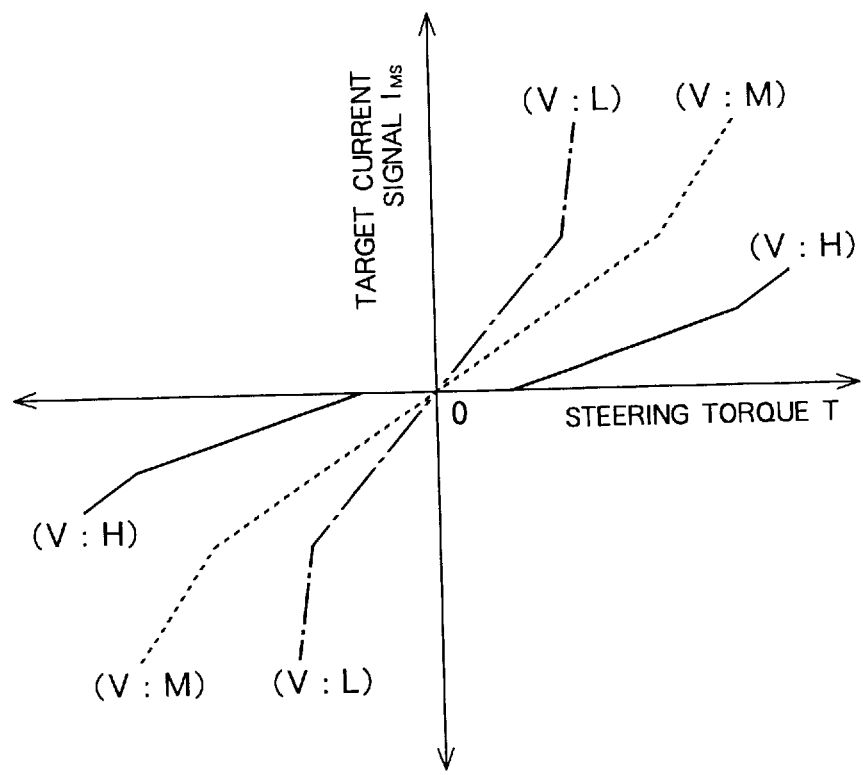
FIG. 5 is a graphical representation of the steering torque vs. target current signal characteristic curves drawn with the vehicle velocity signal taken as a parameter.
Figure 6:
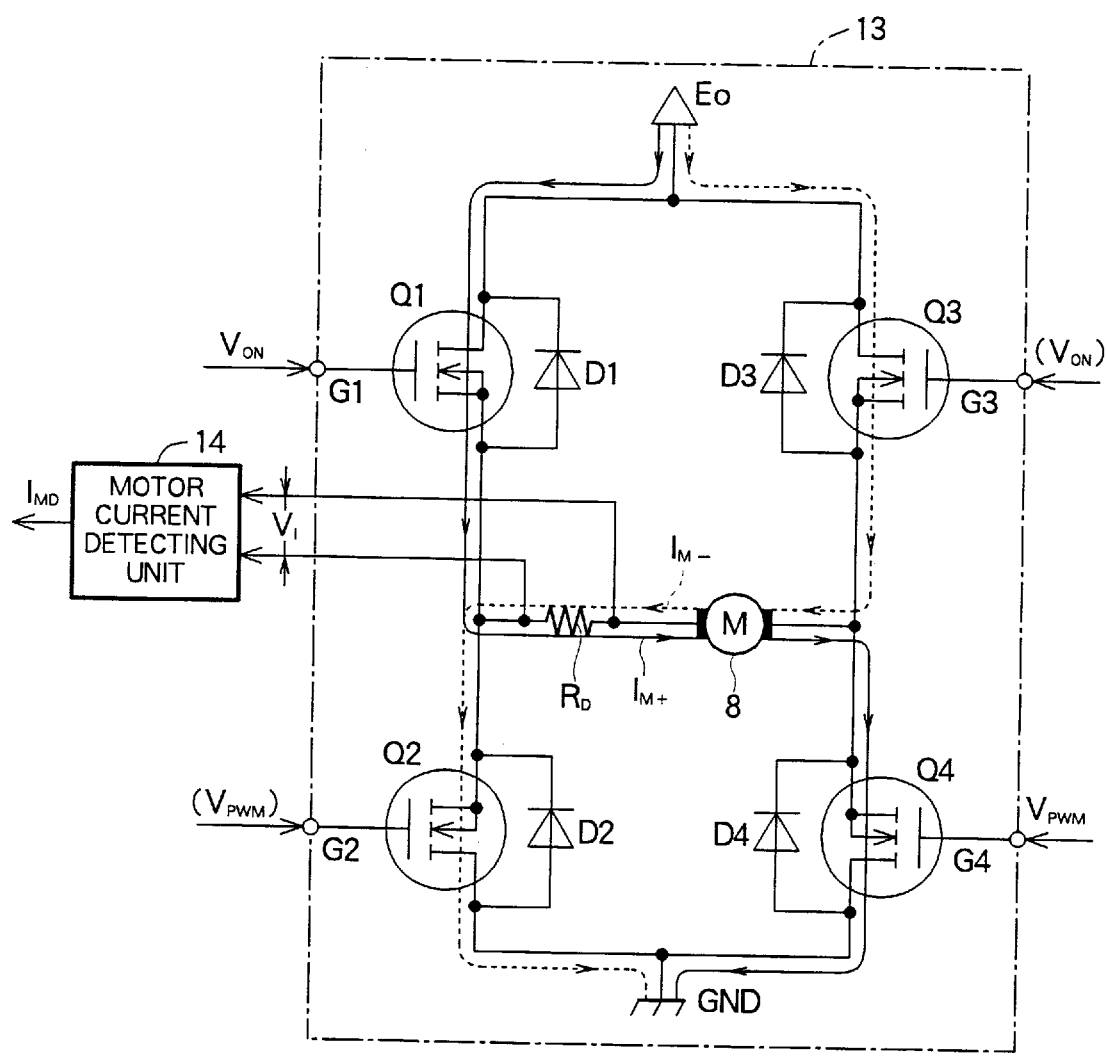
FIG. 6 is a circuit diagram of a bridge circuit of a conventional motor drive unit.
Figure 7:
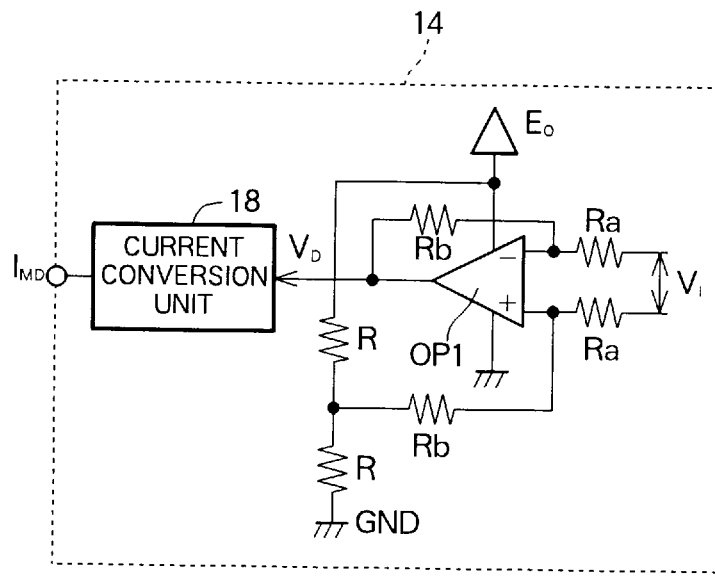
FIG. 7 is a view showing the construction of a main portion of a conventional motor current detecting means or unit.

The target current setting unit 15 and the deviation computing unit 16 are the same in construction as those of the previously described control unit 12 shown in FIG. 4 and a further description will therefore be omitted.

The control unit 20 differs from the control unit 12 in that the low-pass filter 19 is omitted, and the drive control unit 17 is replaced by the drive control unit 21.

The drive control unit 21 controls the respective gates G1–G4 of switching elements or devices Q1–Q4 using a motor control signal $V_O$, which is a mixed signal composed of an ON/OFF signal and a PWM signal for driving and controlling a motor control unit 13, in such a manner that a high-frequency pulse noise component generated when the switching device is driven by the PWM signal does not appear at a current detecting element (resistor $R_D$) connected to a motor current detecting circuit 14.

A PWM control achievable without involving generation of a high-frequency pulse noise component at the current detecting element (resistor $R_D$) will be described with reference to FIG. 2.

In the case where a motor current $I_{M+}$ is to be supplied to the motor 8 (to rotate the motor 8 in the forward direction, for example), the drive control unit 21 supplies an ON signal $V_{ON}$ and a PWM signal $V_{PWM}$ to one pair of FETs (field-effect transistors) Q1 and Q4, respectively, and, at the same time, it also supplies an OFF signal $V_{OFF}$ to the other pair of FETs Q2 and Q3.

In this condition, the motor current $I_{M+}$ is caused to flow along a path which starts from a direct current power supply $E_0$, then passes successively through the FET Q1, the resistor $R_D$, the motor 8, and FET Q4, and finally ends with the vehicle body ground GND. The value of the motor current $I_{M+}$ is determined by the PWM signal $V_{PWM}$ at the FET Q4.

Under the control of the PWM signal $V_{PWM}$, the FET Q4 forms a high-frequency pulse signal source of the PWM signal $V_{PWM}$, and a voltage noise of the high-frequency pulse is supplied to the resistor $R_D$ via the inductance in the motor 8.

The resistor $R_D$ detects a motor current $I_{M+}$ in terms of a voltage given by the product of the motor current $I_{M+}$ and the resistance of the resistor $R_D$ and also detects the high-frequency pulse signal source as a pulse noise voltage which is determined by multiplying the high-frequency pulse signal source with the ratio of the resistance of the resistor $R_D$ to the inductance in the motor 8.

Figure 8:
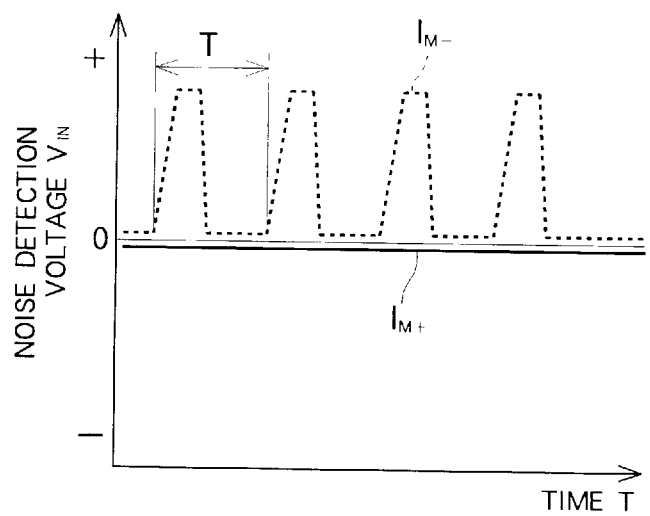
FIG. 8 is a graph showing pulse response waveforms at a resistor in the conventional motor drive unit.

The high-frequency pulse signal is absorbed by the inductance in the motor 8 so that only a small level of voltage having no high-frequency pulse component, such as indicated by the solid line shown in FIG. 8, is detected across the resistor $R_D$.

On the other hand, when a motor current $I_{M-}$ is to be supplied to the motor 8 (to rotate the motor 8 in the reverse direction, for example), the drive control unit 21 supplies an ON signal $V_{ON}$ and a PWM signal $V_{PWM}$ to one pair of FETs (field-effect transistors) Q2 and Q3, respectively, and, at the same time, it also supplies an OFF signal $V_{OFF}$ to the other pair of FETs Q1 and Q4.

In this condition, the motor current $I_{M-}$ is caused to flow along a path which starts from a direct current power supply $E_0$, then passes successively through the FET Q3, the resistor $R_D$, the motor 8, and FET Q2, and finally ends with the vehicle body ground GND. The value of the motor current $I_{M-}$ is determined by the PWM signal $V_{PWM}$ at the FET Q3.

Under the control of the PWM signal $V_{PWM}$, the FET Q3 forms a high-frequency pulse signal source of the PWM signal $V_{PWM}$, and a voltage noise of the high-frequency pulse is supplied to the resistor $R_D$ via the inductance in the motor 8.

The resistor $R_D$ detects a motor current $I_{M-}$ in term of a voltage given by the product of the motor current $I_{M-}$ and the resistance of the resistor $R_D$ and also detects the high-frequency pulse signal source as a pulse noise voltage which is determined by multiplying the high-frequency pulse signal source with the ratio of the resistance of the resistor $R_D$ to the inductance in the motor 8.

Accordingly, in the same manner as the motor current $I_{M+}$, the high-frequency pulse signal is absorbed by the inductance in the motor 8 so that only a small level of voltage having no high-frequency pulse component, such as indicated by the solid line shown in FIG. 8, is detected across the resistor $R_D$.

As previously described with reference to the preferred embodiment, the electric power steering device of this invention includes a motor current detecting unit having a current detecting element connected in series with an electric motor, and a drive control unit operable to drive by a PWM signal (i.e., PWM driving) that side of switching devices which is connected to the motor. With this construction, a high-frequency pulse noise generated by the PWM driving can always be absorbed by the inductance in the motor so that a high-frequency pulse noise detected by the current detecting element is controlled at an extremely small level.

Thus, the electric power steering device provided according to the present invention is able to realize a PWM driving isolated from pulse noises and prevent generation of abnormal noises from the motor and oscillation or hunting of the steering system.

Obviously, various minor changes and modifications of the present invention are possible in the light of the above teaching. It is therefore to be understood that within the scope of the appended claims the invention may be practiced otherwise than as specifically described above in relation to the preferred embodiment of the invention. The scope of the invention is indicated by the appended claims rather than by the foregoing description.

What is claimed is:

1. An electric power steering device comprising:
   an electric motor for applying a steering auxiliary power to a steering system;
   a motor drive unit for rotatably driving the motor in forward and reverse directions and including a bridge circuit composed of two pairs of switching devices and said motor connected so that first and second switching devices in each of said two pairs of said switching devices are driven by an ON signal and a PWM signal, respectively, to drive said motor in the forward or reverse direction;
   a motor current detecting unit for detecting a current flowing through said motor; and
   a control unit including a target current setting unit for setting a target current signal for said motor, means for determining a deviation between the target current signal and a motor current signal detected by the motor current detecting unit, and a drive control unit for outputting a motor control signal to said motor drive unit based on the deviation determined by the determining means,
   said motor current detecting unit including a motor current detecting element connected in series with said motor, said first switching element, drivable by said ON signal, in each of said two pairs of said switching devices being connected via said current detecting element to said motor, and said second switching element, drivable by said PWM signal, in each of said two pairs of switching devices being directly connected to said motor.

2. An electric power steering device according to claim 1, wherein said drive control unit is operable to selectively drive, by said PWM signal, one said switching device of each said pair of switching devices to which said motor is connected.

3. An electric power steering device according to claim 1, wherein said control unit further includes a deviation computing unit for computing said deviation, and said motor current detecting unit is directly connected to said deviation computer unit for providing the motor current signal thereto.

4. An electric power steering device according to claim 1, wherein said electric motor and said current detecting element are disposed in series with and between the switching devices in each of said two pairs of switching devices, and said drive control unit is operable to drive, by said PWM signal, the switching device in each said pair of switching devices to which said motor is connected.

5. An electric power steering device comprising:

an electric motor for applying a steering power to a steering system;

motor drive means for rotatably driving the motor, said motor drive means comprising a bridge circuit of two pairs of switching devices, each pair being controllable by a PWM signal and an ON signal;

control means for providing said PWM signal and said ON signal to said motor drive means for actuating operation of said motor drive means based on a steering input to the steering system and such that said switching devices in each of said two pairs of switching devices are driven by said ON signal and said PWM signal, respectively;

feedback means for providing a feedback signal to said control means indicative of a current flowing through said motor;

said feedback means including a current detecting element connected in series with said motor, said motor and said current detecting element being disposed in series between the switching devices in each of said two pairs, and said control means selectively provide said PWM signal to different ones of said switching devices for rotation of the motor in clockwise and counterclockwise directions and such that said motor is disposed in series between said switching device to which said PWM signal is provided and said current detecting element whether said motor is rotated in the clockwise or the counterclockwise direction; and said control means including a target current setting unit for setting a target current signal for said motor, means for determining a deviation between the target current signal and said feedback signal indicative of the current flowing through said motor, and a drive control unit for outputting said PWM signal to said motor drive means based on the deviation determined by said determining means.

6. An electric steering device according to claim 5, wherein said feedback means consists of a motor current detecting unit including said current detecting element.

7. An electric steering device according to claim 5, wherein said electric motor applies a steering auxiliary power to the steering system.

8. An electric steering device comprising:

an electric motor for applying a steering power to a steering system;

motor drive means for rotatably driving the motor in clockwise and counterclockwise directions, and including a bridge circuit composed of switching devices selectively drivable by a PWM signal;

control means for providing said PWM signal to said motor drive means for actuating said motor drive means based on a steering input to the steering system;

feedback means for providing a feedback signal to said control means indicative of a current flowing through said motor;

said feedback means includes a current detecting element connected in series with said motor;

said control means including a target current setting unit for setting a target current signal for said motor, means for determining a deviation between said target current signal and said feedback signal and a drive control unit for outputting said PWM signal to said motor drive means based on the deviation determined by said determining means; and said control means selectively provides said PWM signal to different ones of said switching devices such that the PWM signal is always isolated from said current detecting element by said motor and such that a high-frequency pulse noise generate by PWM driving of the switching devices is absorbed by inductance in said motor before a current flowing through said motor is detected by said current detecting element.

9. An electric steering device according to claim 8, wherein said motor and said current detecting element are disposed in series with and between a pair of said switching devices whether the motor is being driven in the clockwise direction or the counterclockwise direction.

* * * * *

UNITED STATES PATENT AND TRADEMARK OFFICE
CERTIFICATE OF CORRECTION

PATENT NO : 5,844,387

DATED : 01 December 1998

INVENTOR(S): Yoshinobu Mukai, Yoshiki Noro, Shinzi Hironaka

It is certified that error appears in the above-identified patent and that said Letters Patent are hereby corrected as shown below:

On the cover page, under "[56] References Cited", please insert the following: --

| | | | |
|---|---|---|---|
| 4,765,426 | 8/1988 | Shimizu | 180/79.1 |
| 5,201,818 | 4/1993 | Nishimoto | 180/79.1 |
| 5,361,210 | 11/1994 | Fu | 364/424.05 |
| 5,398,953 | 3/1995 | Shimizu | 180/79.1 |
| 5,404,960 | 4/1995 | Wada et al. | 180/79.1 |
| 5,428,537 | 6/1995 | Kamono et al. | 364/424.05 |
| 5,469,357 | 11/1995 | Nishimoto | 364/424.05 |
| 5,482,129 | 1/1996 | Shimizu | 180/79.1 |
| 5,485,067 | 1/1996 | Nishimoto et al. | 318/466 |
| 5,569,991 | 10/1996 | Matsuoka et al. | 318/286 |
| 5,574,344 | 11/1996 | Matsuoka et al. | 318/293 |
| 5,612,877 | 3/1997 | Shimizu et al. | 364/424.051 |
| 5,631,529 | 5/1997 | Shimizu et al. | 318/432 |
| 5,631,833 | 5/1997 | Wada et al. | 364/424.052 |
| 5,659,472 | 8/1997 | Nishino et al. | 364/424.051 -- ; | on the cover page, under "[57] ABSTRACT", 7th line, before "switching" insert --the--;

10th line, change "the the" to --the--.

Column 2, 37th line, change "dive" to --drive--.

Column 4, line 3, after "thereof" insert a right parenthesis;

42nd line, change "drive" to --driving--;

43rd line, change "driving" to --drive--.

UNITED STATES PATENT AND TRADEMARK OFFICE
CERTIFICATE OF CORRECTION

PATENT NO : 5,844,387
DATED : 01 December 1998
INVENTOR(S): Yoshinobu Mukai, Yoshiki Noro, Shinzi Hironaka It is certified that error appears in the above-identified patent and that said Letters Patent are hereby corrected as shown below:

Column 6, line 6, change "block similar to FIG. 1, but diagram" to
--block diagram similar to FIG. 1, but--.

Column 7, 49th line, change "term" to --terms--.

Column 10, line numbered 34 (30th printed line), change "generate" to --generated--.

Signed and Sealed this

Sixth Day of April, 1999

Attest:

Q. TODD DICKINSON

Attesting Officer

Acting Commissioner of Patents and Trademarks